United States Patent [19]

Copher et al.

[11] Patent Number: 5,081,334
[45] Date of Patent: Jan. 14, 1992

[54] GAS SHIELD FOR WELDING

[75] Inventors: James E. Copher, Denton, Md.; Kenneth F. Krysiak, West Grove, Pa.; Alfred J. Paoletti, Willingboro, N.J.

[73] Assignee: Hercules Incorporated, Wilmington, Del.

[21] Appl. No.: 594,133

[22] Filed: Oct. 10, 1990

[51] Int. Cl.⁵ .............................................. B23K 9/173
[52] U.S. Cl. .................................. 219/74; 219/137.61
[58] Field of Search ............................ 219/137.61, 74

[56] References Cited

U.S. PATENT DOCUMENTS

| | | |
|---|---|---|
| 2,496,347 | 2/1950 | Herbst . |
| 2,644,070 | 6/1953 | Herbst . |
| 2,819,383 | 1/1958 | Johnston ............................ 219/74 |
| 2,856,509 | 10/1958 | Stanchus . |
| 2,856,510 | 10/1958 | Jones et al. . |
| 2,977,457 | 3/1961 | Houldcroft et al. . |
| 3,007,033 | 10/1961 | Newman et al. . |
| 3,125,666 | 3/1964 | Gorman et al. . |
| 3,253,113 | 5/1966 | Breymeier . |
| 3,539,756 | 11/1970 | Schwartzbart et al. ....... 219/137.61 |
| 3,875,364 | 4/1975 | Boyett . |
| 4,626,646 | 12/1986 | Hilton . |
| 4,680,440 | 7/1987 | Barlet . |

FOREIGN PATENT DOCUMENTS

| | | | |
|---|---|---|---|
| 55-42667 | 2/1977 | Japan ..................................... | 219/74 |
| 513804 | 6/1976 | U.S.S.R. . | |
| 1268341 | 11/1986 | U.S.S.R. ................................ | 219/74 |
| 874112 | 8/1961 | United Kingdom . | |

OTHER PUBLICATIONS

"Survey of Joining and Cutting Processes", American Welding Society Welders Handbook 8th Ed., vol. 1; Welding Technology, pp. 12-13.
"Plasma Arc Welding", pp. 214-215, 218; Gas Tungsten Arc Welding, pp. 180, 183, 188, 195-196, 210-211.
"Flux Cored Arc Welding", pp. 96-99, Metals Handbook 9th Ed., vol. 6; Welding, Braising and Soldering.
Kirk-Othmer Encyclopedia of Chemical Technology, vol. 24, pp. 502-507.

Primary Examiner—Clifford C. Shaw
Attorney, Agent, or Firm—Wegner, Cantor, Mueller & Player

[57] ABSTRACT

Disclosed is an improvement in a process of arc welding a work piece involving feeding a consumable electrode through a current-carrying sleeve to the arc to form a weld pool on the work piece. The improvement involves passing a stream of shielding gas inside the sleeve toward the weld pool.

10 Claims, 5 Drawing Sheets

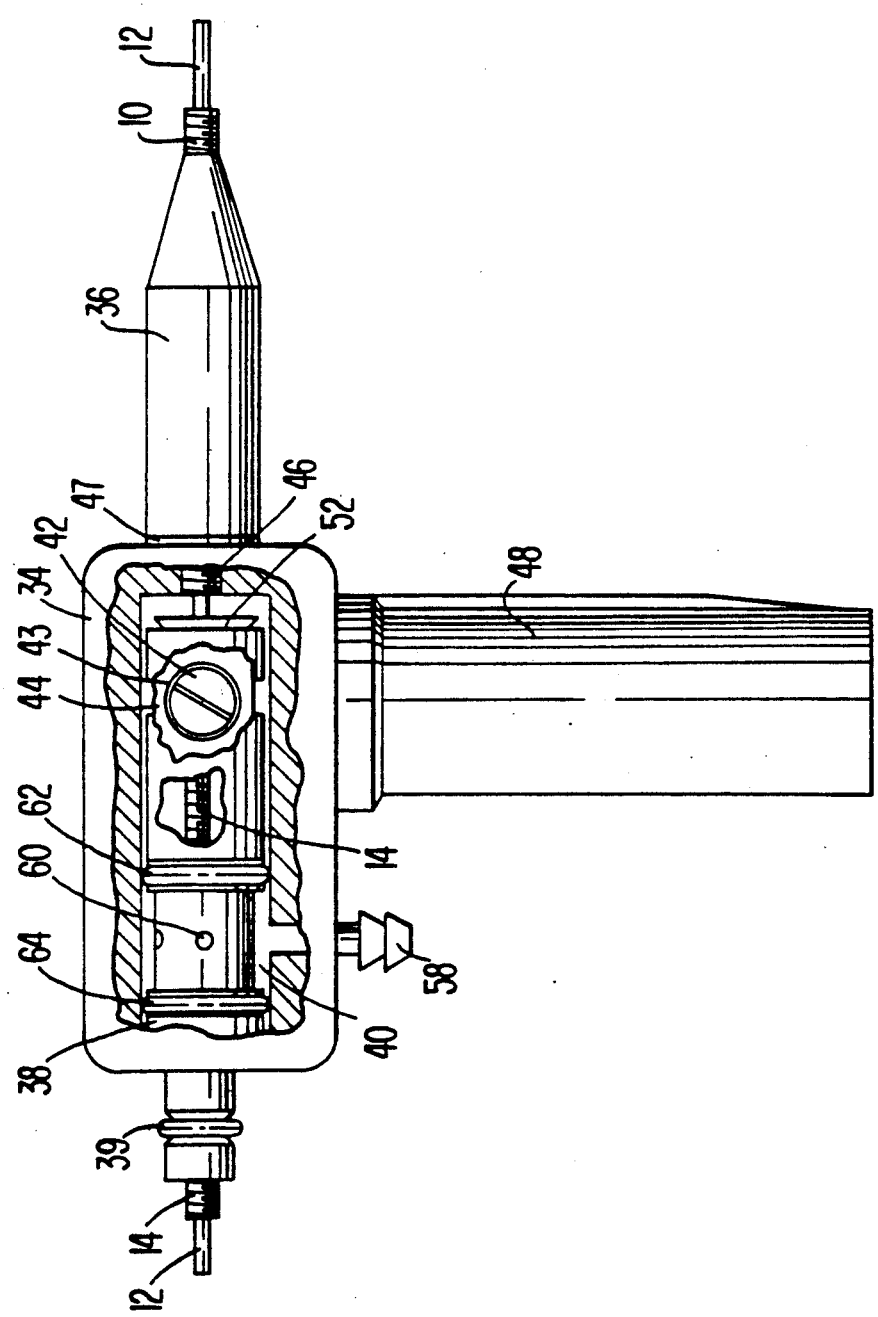

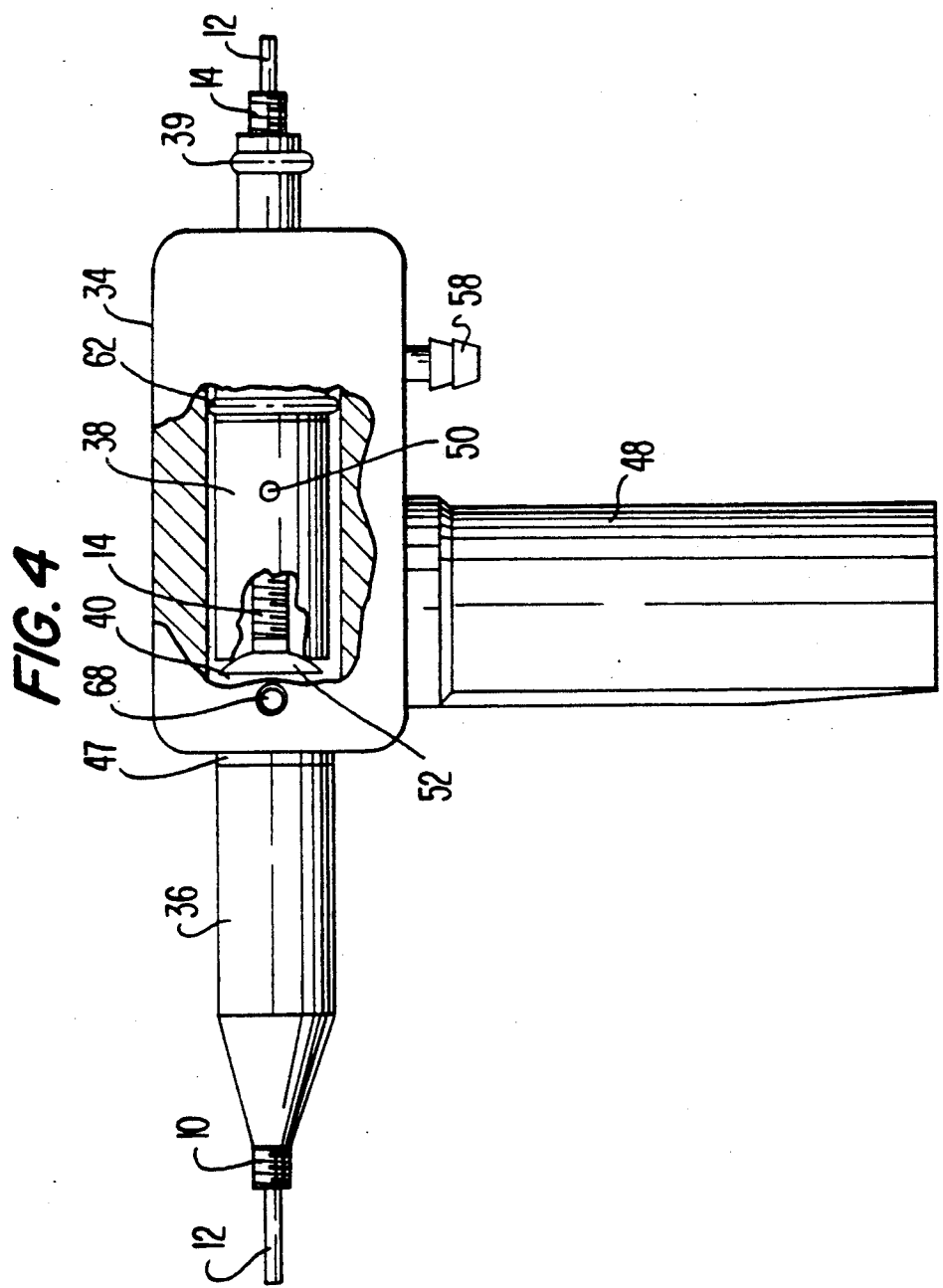

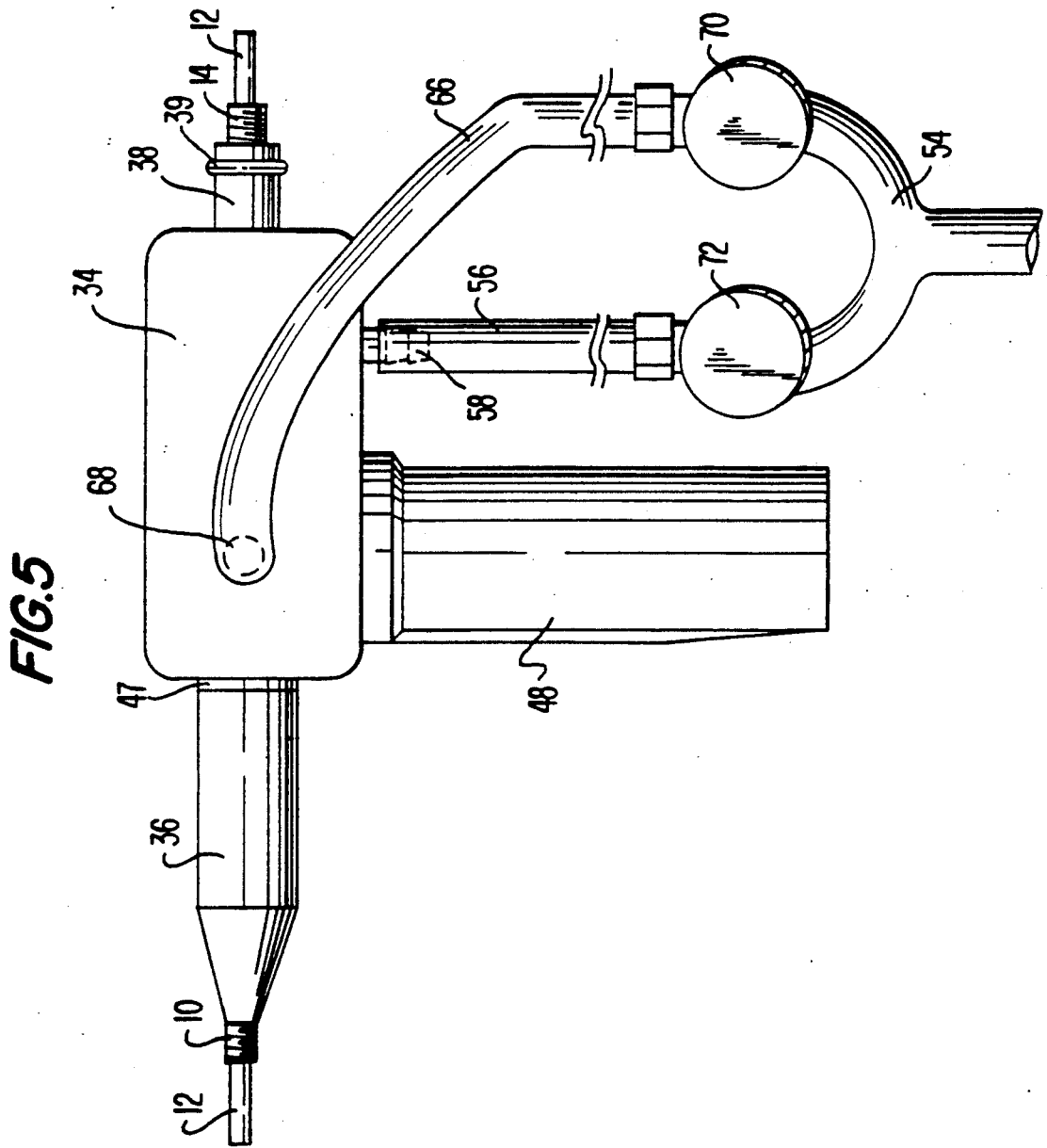

GAS SHIELD FOR WELDING

The present invention relates to arc welding. In particular, it relates to an arc welding process wherein a feed tube guides a consumable electrode to the arc in order to form the weld pool.

In arc welding an intensely hot electric arc is generated between an electrode and a metal base, which grounds the electric current. The heat generated by this arc melts the filler metal material used to make the weld. In some forms of arc welding, the electrode itself is consumed as the filler metal and becomes part of the weld. In these processes, an electrode in the form of a long wire, typically wound on a spool, is continuously fed to the weld through a current-carrying guide tube (sleeve), which is connected to the source of the electric current. Such processes include, for example, gas metal arc welding (GMAW) and flux cored arc welding (FCAW).

During arc welding processes, it is preferable to protect the forming weld of molten metal (weld pool) under the arc from certain elements in the atmosphere, such as oxygen, nitrogen, and hydrogen. These elements can react with the molten metal and cause problems, such as sputtering or the forming of oxides, nitrides, or hydrides, which can adversely affect the integrity of the weld. In processes involving consumable electrodes, for example, this protection was accomplished by a shielding gas, which was directed by a nozzle in an annular stream around the electrode as it exited the current-carrying sleeve. However, such known techniques have completely eliminated these problems.

Accordingly, the present invention provides an improvement in an arc welding process for welding a work piece comprising feeding a consumable electrode through a current-carrying sleeve to the arc to form a weld pool on the work piece, wherein the improvement comprises passing a stream of shielding gas inside the guide tube such that the gas exits the guide tube along with the wire toward the weld pool. The present invention also provides a work piece welded in accordance with the process and an apparatus for performing the process.

FIG. 3 is a sectional view of a preferred embodiment of the present invention.

FIG. 4 is a sectional view of a preferred embodiment of the present invention.

FIG. 5 is a side view of a preferred embodiment of the present invention.

Arc welding process using consumable electrodes, such as GMAW and FCAW, and equipment are well known as disclosed in U.S. Pat. Nos. 2,856,509, 2,977,457, 3,007,033, 3,253,113, and 4,626,646 as well as in *Kirk-Othmer Encyclopedia of Chemical Technology*, Third Ed., V. 24, pp. 502-507, the disclosures of which are incorporated herein by reference. In these processes an arc is struck between the work piece to be welded and a consumable electrode, which is continuously fed into the arc through a current-carrying sleeve. In GMAW, for example, the electrode is made of the selected weld filler metal. Such metals include, e.g., carbon steel, stainless steel, aluminum, nickel, copper, titanium, zirconium, tantalum, and alloys thereof. In FCAW, for example, the electrode is flux cored, i.e., a sheath of the filler metal surrounds a core of fluxing and alloying material.

Preferably, the present invention is also characterized by employing another stream of shielding gas, which passes outside the current-carrying sleeve and is directed around the end of the sleeve in an annular fashion to shroud the arc and the weld pool. This further protects the weld pool and subsequent weld from being oxidized or otherwise compromised by air or other ambient material. Uses of shielding gases outside the sleeve in arc welding processes involving consumable electrodes are well known, such as disclosed in the aforesaid references. Accordingly, known arc welding processes using consumable electrodes are used and modified following a preferred embodiment of the present invention to pass a stream of shielding gas along the inside of the current-carrying sleeve (secondary gas stream) as well as outside the wire-feed sleeve (primary gas stream).

The same or different shielding gases can be passed inside and outside the current-carrying sleeve in accordance with the present invention. Preferably, the same gas or gas mixture is used in both instances. Useful shielding gases are well known and include, e.g., argon, carbon dioxide, or helium, or, in some instances, mixtures thereof with a small amount of oxygen.

Figure 1:
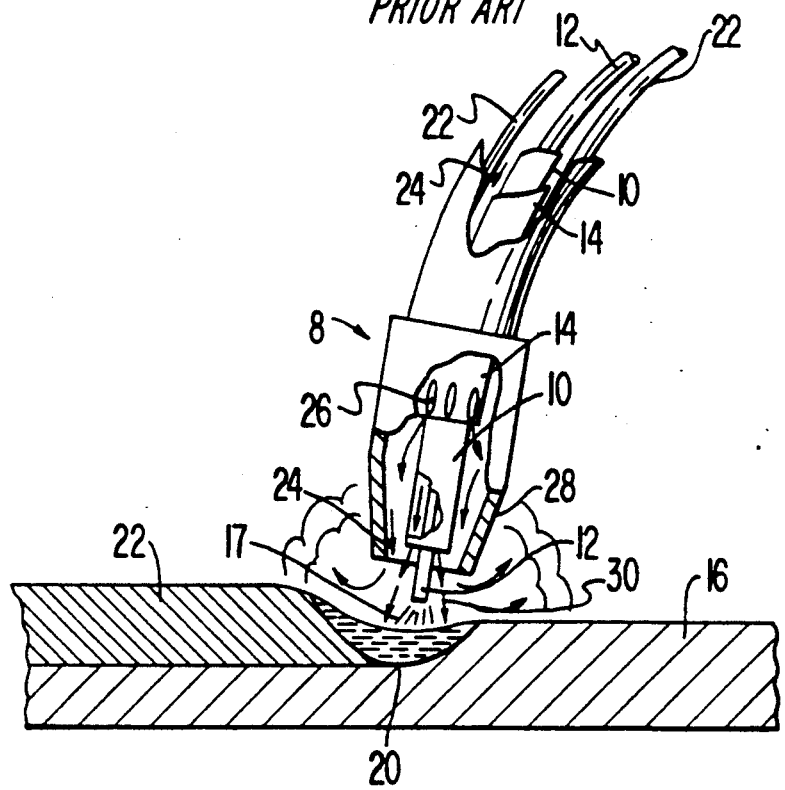
FIG. 1 is a schematic representation of a typical prior art welding arrangement.

The present invention, as well as advantages and features thereof, will be more readily and comprehensively understood from the following detailed description illustrating preferred embodiments thereof, which makes reference to the figures appended hereto. FIG. 1 demonstrates a prior art GMAW process. With reference to FIG. 1, the end of welding gun 8 is pictured in operation. In gun 8 electrode 12 moves through sleeve 10, which is disposed in tube 14, toward work piece 16. Current passing between electrode 12 and work piece 16 creates arc 18, which melts the electrode to form weld pool 20, which eventually solidifies to weld 22. Water circulates through tubes 23 to prevent overheating of the gun. To protect the molten metal leaving the electrode from the surrounding atmosphere, shielding gas 24, carried in tube 14 outside sleeve 10, exits passageways 26 disposed annularly about sleeve 10. Nozzle 28 directs the shielding gas exiting the passageways around the electrode and weld pool, which shields the molten metal from the surrounding atmosphere. However, the inventors discovered that the prior art process did not take into account air 30 (hatched arrows) that was carried inside sleeve 10 along with electrode 12. Gas shield 24 could not prevent air 30, which exited from sleeve 10 along with electrode 12, from mixing and reacting with the molten weld pool. This creates problems with sputtering, oxidation, etc. and imperfect welds.

Figure 2:
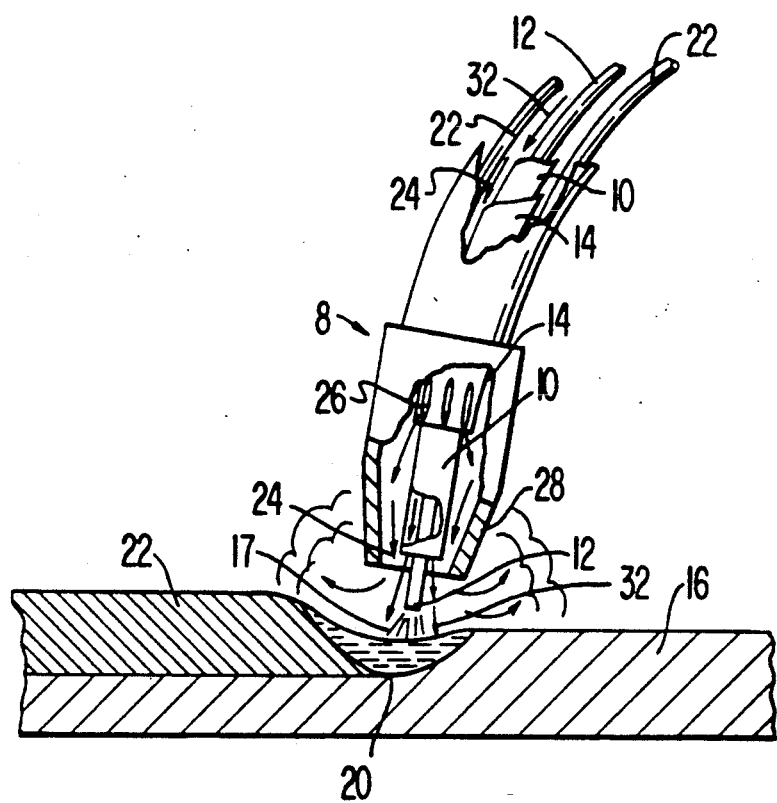
FIG. 2 is a schematic representation of a welding arrangement in accordance with a preferred embodiment of the present invention.

FIG. 2 demonstrates a GMAW process modified in accordance with a preferred embodiment of the present invention. With reference to FIG. 2, shielding gas 32 is directed inside sleeve 10, as well as outside. Pressure forces the gas towards both ends of the sleeve. This keeps air out of the sleeve, thus preventing air from reaching the weld pool through the sleeve, and causing sputtering and imperfect welds. It further provides an additional shield around the melting electrode as it forms the weld pool. Combination of shielding gas 24 with shielding gas 32 is, accordingly, more effective in protecting the weld from air.

FIGS. 3, 4, and 5 illustrate an assembly for effecting a preferred embodiment of the present invention. With reference to FIGS. 3-5, housing unit 34 accommodates wire-feed adaptor 36 and welding-gun coupler 38. Coupler 38 fits in chamber 40 in housing 34 and is secured in place by set screw 42, which cooperates with groove 44 in coupler 38. Set screw 42 is provided with gasket 43 to form a seal. End 46 of adaptor 36 screws into housing 34, and is provided with gasket 47 to form a seal. Arm 48 of unit 34 accommodates an electric power cable (not shown). Electrode 12, disposed inside wire-feed sleeves 10 and 14, runs through adaptor 36 and coupler 38 to a welding gun (not shown). Sleeve 14 is fixed inside coupler 38 with set screw 50 such that flange 52 of sleeve 14 seats tightly in the end of coupler 13. Gas from a source (not shown) travels through Y connector 54 and tube 56 coupled to barb 58 into chamber 40. O rings 62 and 64 restrict gas flow therebetween in a restricted space of chamber 40, which forces the gas inside coupler 38 through holes 60. Inside coupler 38, the seal formed by the tight seat of flange 52 in one end of coupler 38 forces the gas out the other end of coupler 38, which fits into a tube in the welding gun (not shown) sealed by O ring 39, around sleeve 14 and through the welding-gun tube, which delivers the gas to the weld (see FIG. 2). A secondary stream of shielding gas also travels through Y connector 54 and tube 66 to barb 68, which delivers gas to chamber 40. Valves 70 and 72 control the flow of primary and secondary shielding gas, if desired. Typically, both valves are fully open. Seals formed by gaskets 43 and 47, O ring 62, and the tight seat formed between flange 52 and coupler 38 force the secondary gas entering chamber 40 to flow inside sleeves 10 and 14. Secondary gas flows through sleeve 14 around electrode 12 until it reaches the end of the welding gun (not shown) and is delivered to the weld (see FIG. 2). Gas flowing through sleeve 10 prevents air from entering chamber 40 through sleeve 10 and being sucked into sleeve 14.

Advantageously, both primary and secondary gas can be purified by known means before being used in accordance with the present invention. Useful purification media include, for example, a highly porous, organometallic polymer resin as disclosed in U.S. Pat. No. 4,603,148, incorporated herein by reference. Gas purification systems for welding containing such media are known, such as a cartridge system under the name NANOCHEM Model W-400, available from Hercules Incorporated, Wilmington, Del.

The foregoing description provides preferred embodiments of the present invention. It is to be understood that the invention is not limited thereto, but can be otherwise variously embodied and practiced within the scope of the following claims.

What is claimed:

1. In a process of arc welding a work piece comprising feeding a consumable electrode through a current-carrying sleeve having opposing ends disposed in a tube in a welding gun while passing shielding gas between the sleeve and the tube one of said ends communicating with a nozzle in the gun, the improvement comprising passing a stream of shielding gas inside the sleeve so as to exit both ends of the sleeve.

2. The process of claim 1 wherein the consumable electrode is a filler-metal wire.

3. The process of claim 1 wherein the consumable electrode is a flux-corded filler-metal wire.

4. The process of claim 1 wherein the stream of shielding gas and flow of shielding gas are each an inert gas.

5. The process of claim 1 wherein the stream of shielding gas passes in both directions inside the sleeve.

6. The product made according to the process of claim 1.

7. In an apparatus for arc welding a work piece comprising (a) an electric-current-carrying sleeve having opposing ends disposed in a tube in a welding gun one of said ends communicating with a nozzle in the gun and capable of guiding a moving consumable electrode from one end of the sleeve to the other end, (b) means for connecting the sleeve to a current source, and means for passing a shielding gas between the sleeve and the tube, the improvement comprising means for passing a shielding gas from a source thereof to inside the sleeve so as to exit both ends of the sleeve.

8. The apparatus of claim 7 further comprising a consumable electrode.

9. The apparatus of claim 8 wherein the consumable electrode is a filler-metal wire.

10. The apparatus of claim 8 wherein the consumable electrode is a flux-cored filler-metal wire.

* * * * *